United States Patent
Hiraguchi

(10) Patent No.: US 7,530,518 B2
(45) Date of Patent: *May 12, 2009

(54) RECORDING TAPE CARTRIDGE

(75) Inventor: Kazuo Hiraguchi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 23 days.

This patent is subject to a terminal disclaimer.

(21) Appl. No.: 11/762,234

(22) Filed: Jun. 13, 2007

(65) Prior Publication Data

US 2007/0284469 A1 Dec. 13, 2007

(30) Foreign Application Priority Data

Jun. 13, 2006 (JP) .............................. 2006-163708

(51) Int. Cl.
G03B 23/02 (2006.01)

(52) U.S. Cl. ...................... 242/338.1; 242/348; 360/132

(58) Field of Classification Search ................. 242/338, 242/338.1, 343, 343.1, 343.2, 348, 332.4; 360/132

See application file for complete search history.

(56) References Cited

U.S. PATENT DOCUMENTS

| | | | | |
|---|---|---|---|---|
| 3,227,387 | A | | 1/1966 | Laa et al. |
| 4,033,523 | A | * | 7/1977 | Roman ..................... 242/338.1 |
| 5,436,782 | A | * | 7/1995 | Sieben ........................ 360/132 |
| 5,813,622 | A | | 9/1998 | von Alten |
| 6,572,046 | B2 | * | 6/2003 | Brummet .................. 242/338.1 |
| 6,739,537 | B2 | * | 5/2004 | Mizutani et al. .......... 242/332.4 |
| 7,128,288 | B2 | * | 10/2006 | Takahashi ................. 242/338.1 |
| 7,159,815 | B2 | | 1/2007 | Alexander et al. |
| 7,175,123 | B2 | | 2/2007 | Hiraguchi |
| 7,175,124 | B2 | | 2/2007 | Hiraguchi |
| 7,416,148 | B2 | * | 8/2008 | Hiraguchi ................. 242/338.1 |
| 2005/0284973 | A1 | * | 12/2005 | Takahashi ................. 242/338.1 |

FOREIGN PATENT DOCUMENTS

| | | |
|---|---|---|
| JP | 2005-56485 A | 3/2005 |
| JP | 2005-56544 A | 3/2005 |
| JP | 2005-276416 A | 6/2005 |
| JP | 2007-35229 A | 2/2007 |

* cited by examiner

Primary Examiner—William A Rivera
(74) Attorney, Agent, or Firm—Sughrue Mion, PLLC

(57) ABSTRACT

Sliding resistance at a time when a locking member is moved between a locking position and an unlocking position with respect to a reel can be lessened, and deformation of a flange welded to a hub also can be suppressed. In a recording tape cartridge 10 in which a reel 20, at which an upper flange 24 is welded to a hub 22, is singly and rotatably accommodated within a case 12, a locking member 70 is configured to be able to rotate within a plane orthogonal to a rotation axis direction of the reel 20 around a position which is different from a rotational center of the reel 20. The locking member 70 is set at a locking position, at which the locking member 70 is interposed on an extended line of the hub 22 in the rotation axis direction at a side where the upper flange 24 is welded and the locking member 70 impedes movement of the reel 20 in the rotation axis direction, and an unlocking position, at which the locking member 70 is withdrawn from the extended line of the hub 22 in the rotation axis direction at the side where the upper flange 24 is welded and the locking member 70 permits movement of the reel 20 in the rotation axis direction.

5 Claims, 13 Drawing Sheets

RECORDING TAPE CARTRIDGE

CROSS-REFERENCE TO RELATED APPLICATION

This application claims priority under 35 USC 119 from Japanese Patent Application No. 2006-163708, the disclosure or which is incorporated by reference herein.

BACKGROUND OF THE INVENTION

1. Field of the Invention

The present invention relates to a recording tape cartridge which accommodates, within a case, a single reel on which is wound a recording tape, such as a magnetic tape or the like, which is used as a recording/playback medium mainly of computers or the like.

2. Description of the Related Art

Them have conventionally been known recording tape cartridges in which a recording tape, such as a magnetic tape or the like which is used as a data recording/playback medium (for data backup) of computers or the like, is wound on a reel, and the reel is singly and rotatably accommodated within a case which is made of a synthetic resin. Such a recording tape cartridge is generally structured such that at the time when the recording tape cartridge is not in use (is not loaded in a drive device) the reel is mechanically braked in the rotating direction, and, in the rotation axis direction, is merely urged by an urging means such as a compression coil spring or the like.

However, here, if an impact is applied to the recording tape cartridge due to the recording tape cartridge being handled by a user or being dropped or the like when the recording tape cartridge is not in use, due to this impact, the reel easily moves in the rotation axis direction, and, depending on the case, there is the problem that the rotating direction braking of the reel is cancelled and wrinkles or the like are formed in the recording tape. Therefore, in recent years, recording tape cartridges have been proposed which are structured such that, when not in use, the reel is restricted so as to not move in the rotation axis direction, and, when in use, this restriction is released simply, such as disclosed in Japanese Patent Application Laid-Open (JP-A) No. 2005-276416 for example.

The above-described recording tape cartridge is structured such that, when the recording tape cartridge is not in use, locking members enter-in between an upper flange of the reel and a ceiling plate of the case, and the reel is thereby restricted so as to not move in the rotation axis direction. Namely, the leeway for the reel to move in the rotation axis direction is eliminated by the locking members. When the recording tape cartridge is being used, a releasing operation, in which a braking member which restricts the reel so as to not move in the rotating direction is raised-up by a releasing member of the drive devices is utilized such that a taper portion formed at the locking members is pushed, and the locking members are thereby slid in a radial direction of the reel and withdrawn (the restriction of the locking members is released).

In order to ensure space for movement of the locking members in the radial direction of the reel due to the braking member moving in the rotation axis direction of the reel, the angle of the taper portion formed at the locking member is made to be 45°. However, if the taper portion of the locking members is 45°, the component of force of the force applied in the rotation axis direction of the reel works greatly, and therefore, rubbing arises between the locking members and the inner surface of the ceiling plate of the case, and there is the problem that the powder-like substance generated at the time of this rubbing increases the sliding resistance (the dynamic friction coefficient) of the locking members with respect to the inner surface of the ceiling plate of the case.

When the sliding resistance (the dynamic friction coefficient) of the locking members with respect to the inner surface of the ceiling plate of the case increases, a very large moving force (lock releasing force) in the rotation axis direction of the reel is needed at the braking member. Therefore, overload is applied to the driving source which lowers the recording tape cartridge relative to a reference plane of the drive device, and trouble or the like is brought about at the drive device. Further, there are cases in which tight-winding deformation arises at the hub of the reel due to the recording tape being wound onto the hub. In such cases, there is the problem that the flanges which are welded to the hub deform in directions of approaching the recording tape.

SUMMARY OF THE INVENTION

The present invention has been made in view of the above circumstances, and provides a recording tape cartridge.

A first aspect of the present invention provides a recording tape cartridge comprising: a reel having a hub on which a recording tape is wound, and flanges holding the recording tape wound on the hubs at least one of the flanges being welded to the hub; a case accommodating the reel singly and rotatably; and a locking member configured to be able to rotate within a plane which is orthogonal to a rotation axis direction of the reel around a position which is different from a rotational center of the reel, the locking member being set at a locking position, at which the locking member is interposed on an extended line of the hub in the rotation axis direction at a side where the flange is welded and the looking member impedes movement of the reel in the rotation axis direction, and an unlocking positions at which the locking member is withdrawn from the extended line of the hub in the rotation axis direction at the side where the flange is welded and the locking member permits movement of the reel in the rotation axis direction.

BRIEF DESCRIPTION OF THE DRAWINGS

Embodiments of the present invention will be described in detail based on the following figures, wherein.

DETAILED DESCRIPTION OF THE INVENTION

Hereinafter, an example of an exemplary embodiment of the present invention will be described in detail with reference to the drawings. Note that, for convenience of explanation, in FIG. 1, the direction of loading a recording tape cartridge 10 into a drive device is indicated by arrow A, and this is the forward direction (front side) of the recording tape cartridge 10. The direction of arrow b, which is orthogonal to arrow A, indicates the right direction (right side), the direction of arrow C indicates the upward direction (upper side), and front, back, left, right, up, down are expressed on the basis of these directions. Further, the expression "radial direction" hereinafter means a direction parallel to a direction which is oriented radially outward from the axially central (central) line of a reel accommodated in a case.

Figure 1:
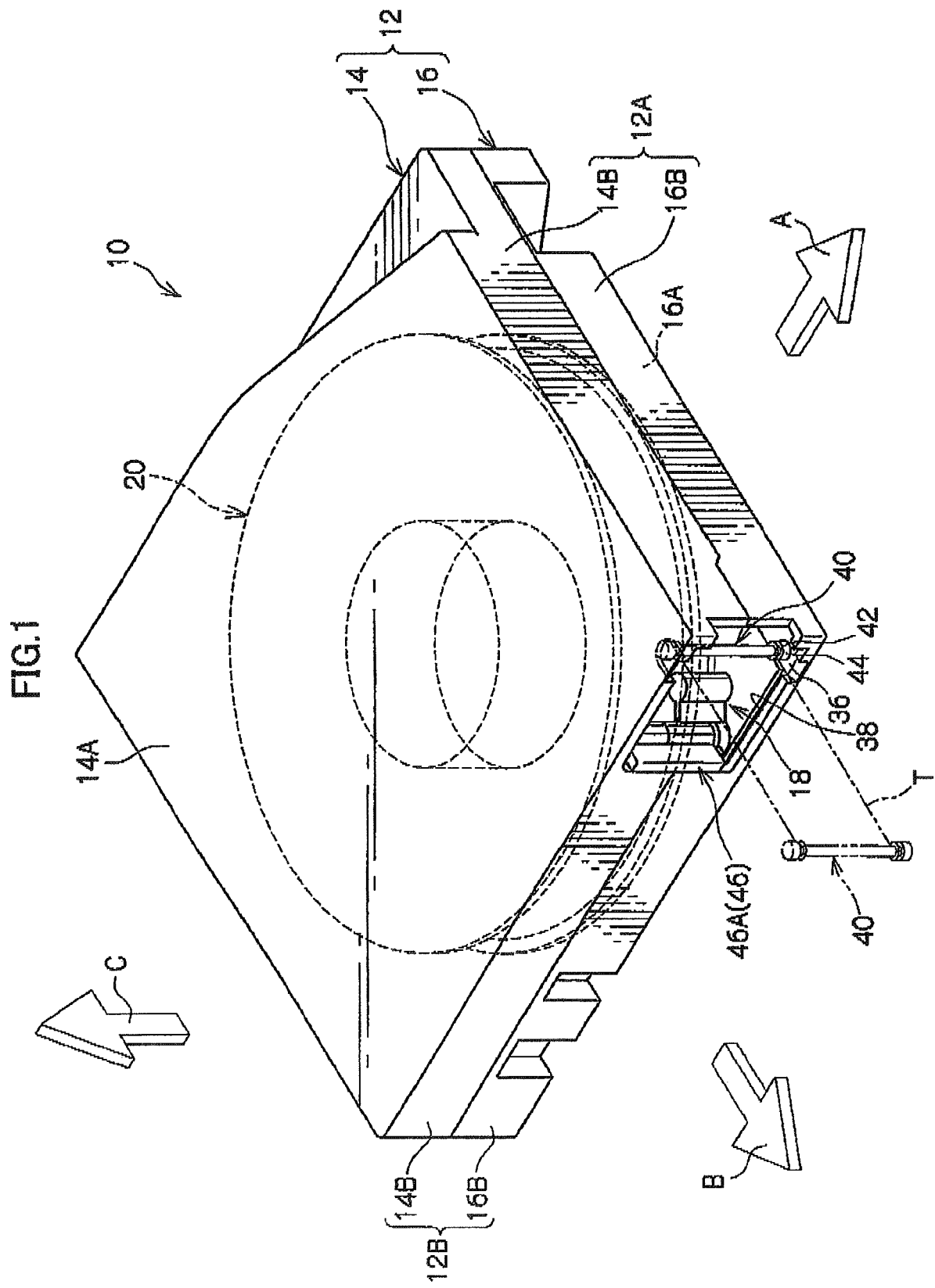
FIG. 1 is a schematic perspective view of a recording tape cartridge.
Figure 2:
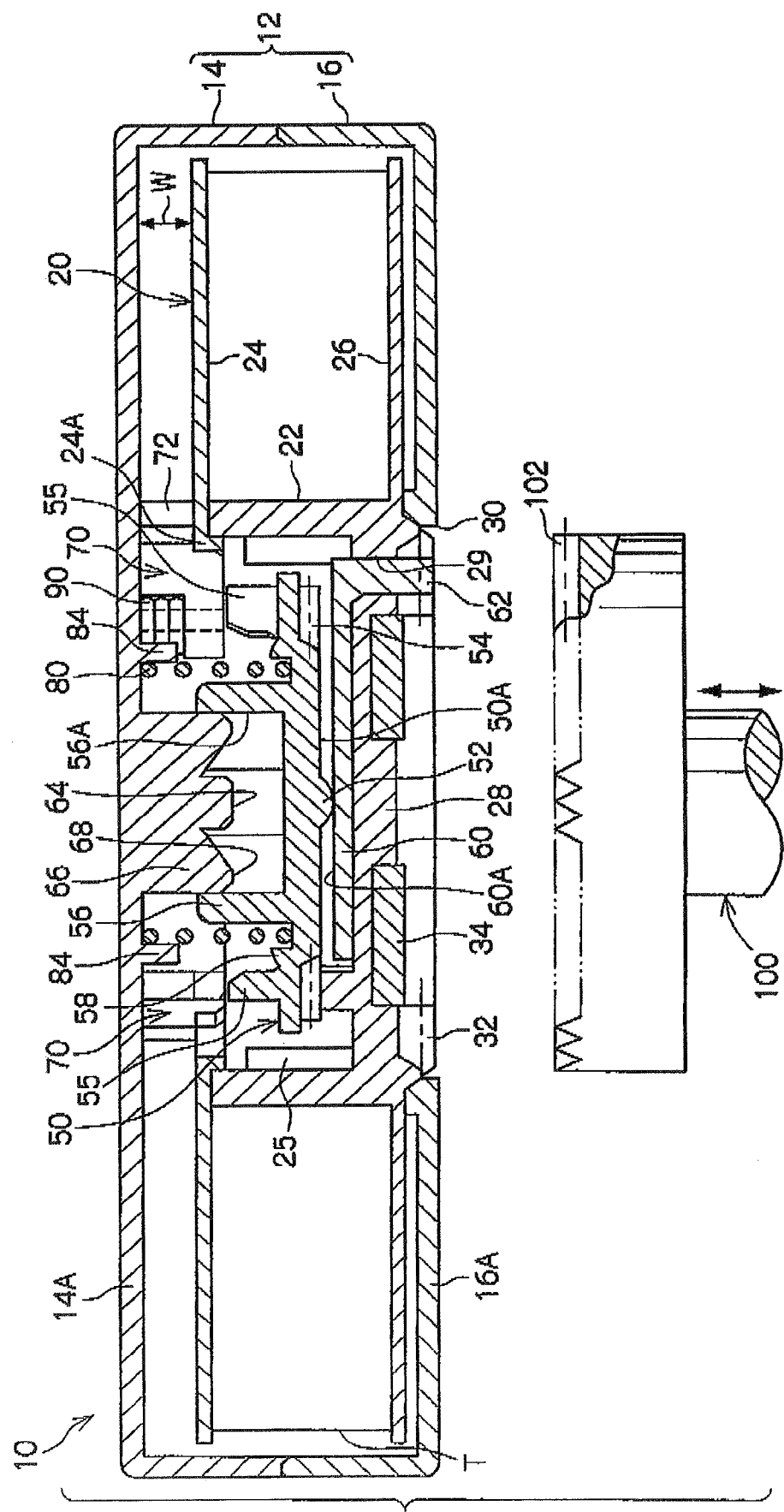
FIG. 2 is a schematic side cross-sectional view of the recording tape cartridge before the raising of a rotating shaft.
Figure 3:
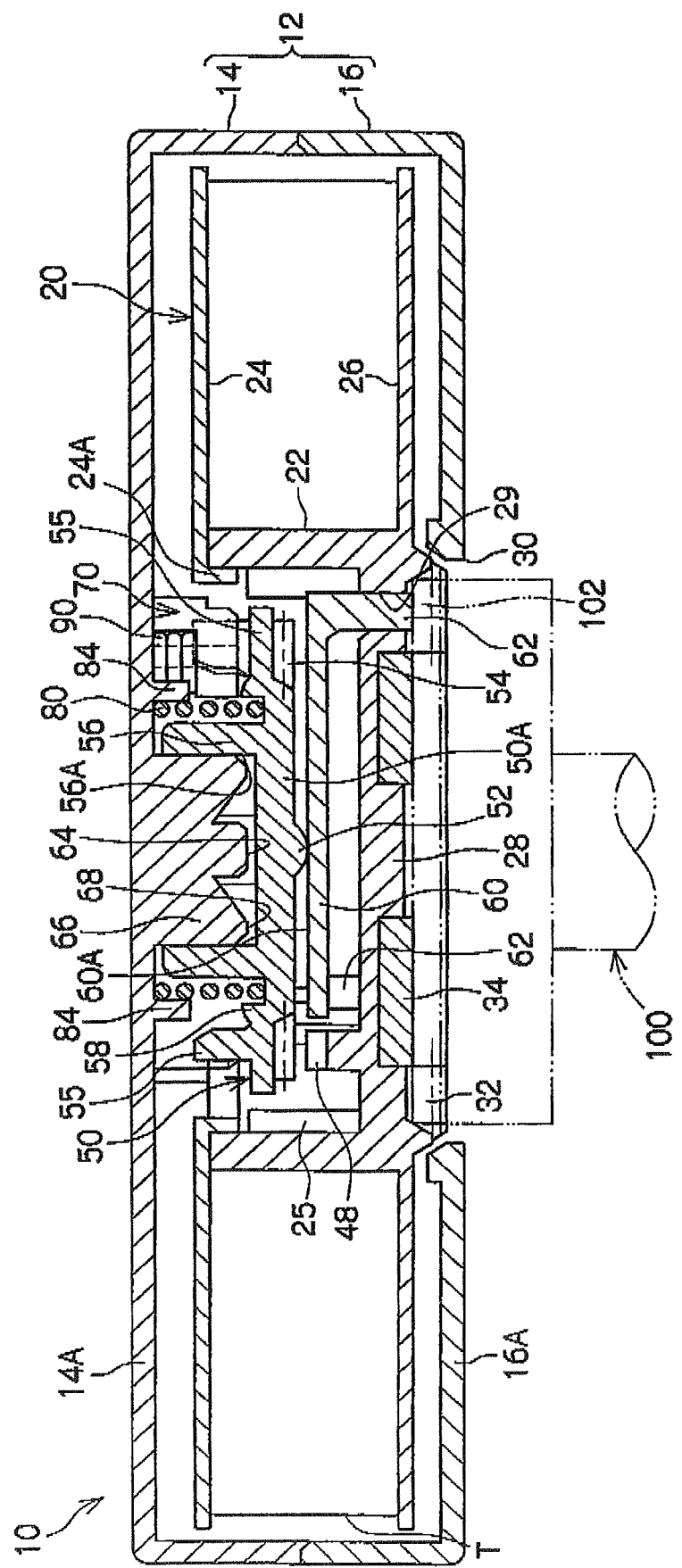
FIG. 3 is a schematic side cross-sectional view of the recording tape cartridge after the raising of the rotating shaft.

As shown in FIG. 1 through FIG. 3, the recording tape cartridge 10 has a substantially rectangular box-shaped case 12. The case 12 is structured by an upper case 14 and a lower case 16, which are molded of a synthetic resin material containing polycarbonate (PC) or acrylonitrile butadiene styrene (ABS) as the main component thereof, e.g., a synthetic resin material in which glass fibers (GF) are mixed-together with PC, being joined together by ultrasonic welding or screws or the like, in a state in which a peripheral wall 14B, which stands erect at the peripheral edge of a ceiling plate 14A of the upper case 14, and a peripheral wall 16B, which stands erect at the peripheral edge of a floor plate 16A of the lower case 16, abut one another.

A single reel 20 is rotatably accommodated within the case 12. The reel 20 is structured such that a reel hub 22, which is shaped as a cylindrical tube having a floor and which structures an axially central portion of the reel 20, and a lower flange 26, which is provided at a lower end portion of the reel hub 22, are molded integrally, and an upper flange 24 is ultrasonically welded to an upper end portion of the reel hub 22 in a state in which an annular extended portion 24A, which stands erect at an inner peripheral edge portion of the upper flange 24, engages with (contacts) the inner peripheral surface of the reel hub 22. A recording tape T, such as a magnetic tape or the like which serves as an information recording/playback medium, is wound on the outer peripheral surface of the reel hub 22. The transverse direction end portions of the recording tape T wound thereon are held by the upper flange 24 and the lower flange 26. Note that the inner diameter of the reel hub 22 is less than or equal to 48 mm.

A reel gear 32 is formed in an annular shape at the bottom surface of a floor wall 28 of the reel hub 22. A gear opening 30, which is for exposing the reel gear 32 to the exterior, is formed in a central portion of the lower case 16. Due to the reel gear 32, which is exposed from the gear opening 30, meshing-together with a driving gear 102 formed at a rotating shaft 100 of the drive device and being rotated and driven thereby, the reel 20 can rotate relative to the case 12 within the case 12. Further, an annular reel plate 34 formed of a magnetic material is fixed by insert molding or the like to the radial direction inner side of the reel gear 32, at the bottom surface of the floor wall 28. The reel plate 34 is attracted to and held by the magnetic force of an annular magnet (not shown) which is provided at the rotating shaft 100 of the drive device.

An opening 18 for pulling-out of the recording tape T wound on the reel 20, is formed at a front portion of a right wall 12B of the case 12. A leader pin 40, which is pulled-out and manipulated while being anchored (engaged) by a pullout member (not shown) of the drive device, is fixed to a free end portion of the recording tape T which is pulled-out from the opening 18. Annular grooves 42 are formed at both end portions of the leader pin 40 which project-out further than the transverse direction end portions of the recording tape T. The annular grooves 42 are anchored by hooks or the like of the pull-out member. In this way, at the time when the recording tape T is pulled-out, the hooks or the like do not contact and scratch the recording tape T.

A pair of upper and lower pin holding portions 36, which position and hold the leader pin 40 within the case 12, are provided at an inner side of the opening 18 of the case 12, i.e., at the inner surface of the ceiling plate 14A of the upper case 14 and the inner surface of the floor plate 16A of the lower case 16. The pin holding portions 36 are formed in substantially semicircular shapes whose recording tape T pull-out sides are open. Both end portions 44 of the leader pin 40, which is in an upright state, can enter into and exit from the pin holding portions 36 from the open sides.

A plate spring (not shown) is disposed and fixed in a vicinity of the pin holding portions 36, Bifurcated distal end portions of the plate spring respectively engage with the upper and lower end portions 44 of the leader pin 40, such that the leader pin 40 is held in the pin holding portions 36. Note that when the leader pin 40 is to enter into or exit from the pin holding portions 36, the distal end portions of the plate spring are appropriately elastically deformed so as to permit movement of the leader pin 40.

The opening 18 is opened and closed by a door 46. The door 46 is formed in the shape of a substantially rectangular plate of a size which can close the opening 18, and is always urged in the direction of closing the opening 18 by an urging member (not shown) such as a coil spring or a torsion spring or the like. Further, groove portions 38, into which the upper and lower end portions of the door 46 are slidably fit, are formed in the ceiling plate 14A and the floor plate 16A at the inner side of the opening 18, such that the door 46 can move along the right wall 12B of the case 12. Moreover, a convex portion 46A for opening/closing operation projects outwardly from the front end portion of the door 46. The convex portion 46A engages with an opening/closing member (not shown) of the drive device as the recording tape cartridge 10 is loaded into the drive device. The door 46 is thereby opened against the urging force of the urging member.

Plural standing ribs 25 of predetermined heights project-out at uniform intervals at the inner peripheral surface of the reel hub 22. Plural engaging gears 48 stand erect at uniform intervals so as to be separated at predetermined intervals at the peripheral edge of the top surface of the floor wall 28 of the reel hub 22 (e.g., three engaging gears 48 at intervals of 120°). Between the engaging gears 48, plural through holes 29 are formed at predetermined positions which are above the reel gear 32 (in this case, three through holes 29 at intervals of 120°).

Figure 4:
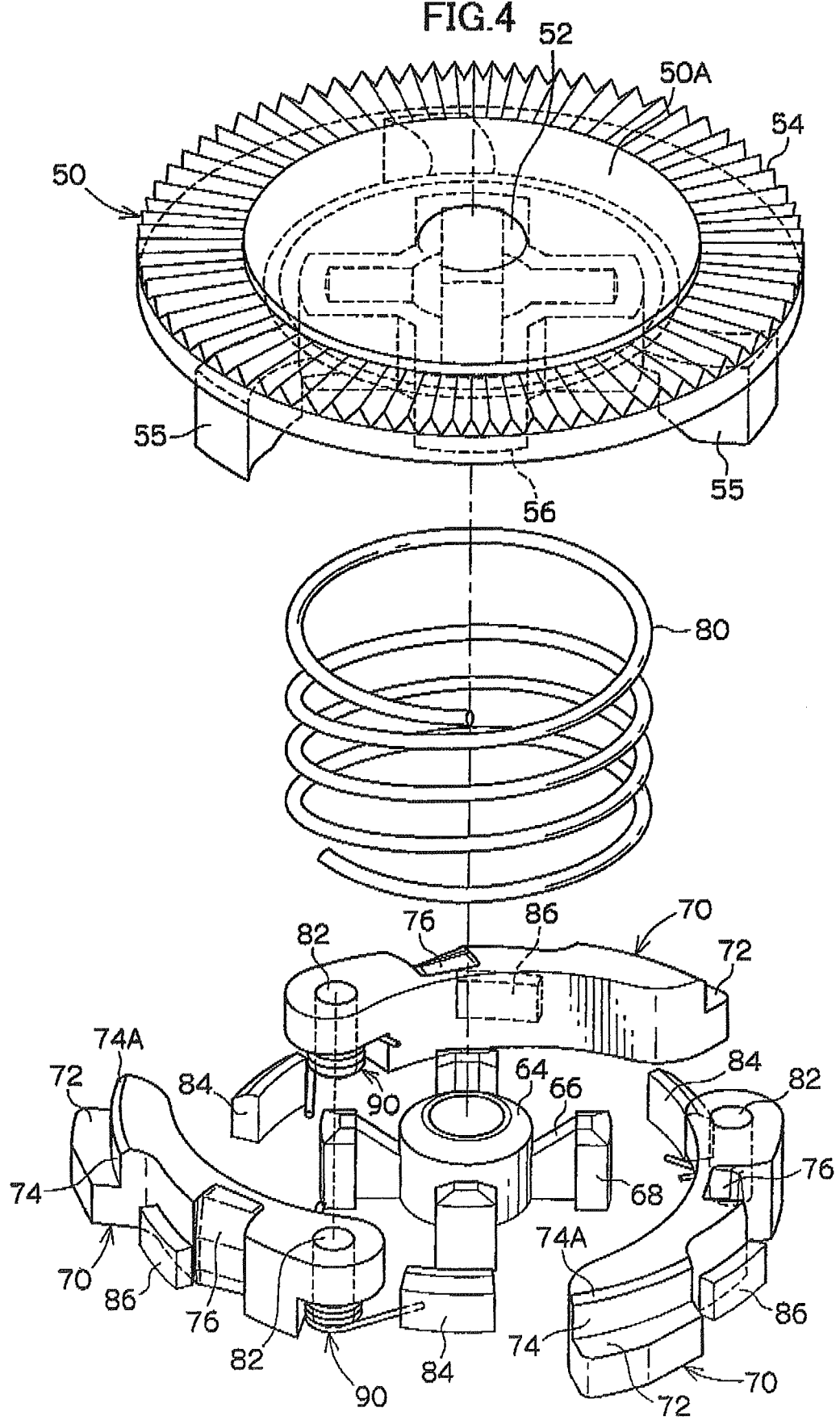
FIG. 4 is a schematic exploded perspective view showing the relationship between locking members and a banking member.
Figure 5:
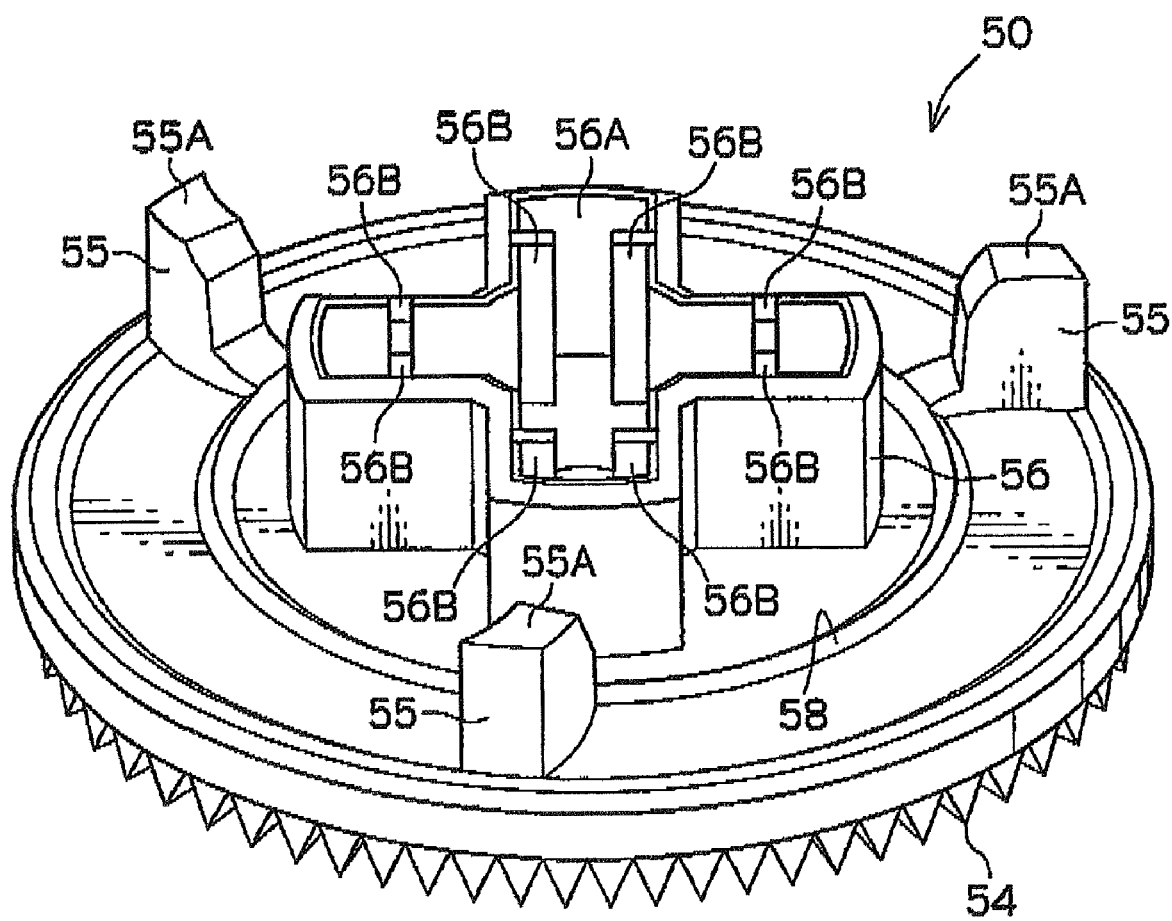
FIG. 5 is a schematic perspective view of the braking member.

Further, as shown in FIGS. 2 through FIG. 4, a substantially cylindrical boss 64 projects to a predetermined height at the substantial center of the inner surface of the ceiling plate 14A of the upper case 14. From the peripheral surface of the boss 64 to the inner surface of the ceiling plate 14A, four rotation restricting ribs 66, which are substantially trapezoidal in side view, project integrally to predetermined heights at uniform intervals so as to be substantially cross-shaped in bottom view. Engaging ribs 68, which are substantially flat-plate-shaped and which run substantially along the peripheral direction of the reel 20, project-out at the inner surface of the ceiling plate 14A at the radial direction distal end portions of the rotation restricting ribs 66, and the rotation restricting ribs 66 are connected integrally to the central portions thereof. Note that the heights of the engaging ribs 68 and the height of the boss 64 are substantially equal.

On the other hand, a braking member 50 serving as a moving member is inserted within the reel hub 22. The braking member 50 is molded of a synthetic resin material containing, for example, polyacetal (POM), polyamide (PA), or polybutylene terephthalate (PBT) as the main component, substantially in the shape of a disc which is accommodated within the reel hub 22 so as to be able to move up and down (so as to be able to move in the rotation axis direction of the reel 20).

Further, as shown in FIG. 2 through FIG. 7, a braking gear 54, which can mesh with the engaging gears 48, is formed in an annular form at the peripheral edge of a bottom surface 50A of the braking member 50. An engaging wall portion 56, which serves as a guide portion and is provided with a groove portion 56A which is substantially cross shaped in plan view and into whose interior the boss 64, the rotation restricting ribs 66, and the engaging ribs 68 are inserted, stands erect at the center of the top surface of the braking member 50 so as to be slightly taller than the heights of the boss 64 and the engaging ribs 68.

Pairs of partitioning portions 56B, which prescribe spaces for accommodating the engaging ribs 68, project within the groove portion 56A to substantially the same height as the engaging wall portion 56. The interval between the partitioning portions 56B is formed to be slightly larger than the plate thickness of the rotation restricting rib 66. In this way, the braking member 50 cannot rotate with respect to the case 12 (the upper case 14), and can move within the reel hub 22 upward and downward (the rotation axis direction of the reel 20) while being guided so as to not tilt.

A compression coil spring 80 serving as an urging member is disposed between the upper case 14 and the braking member 50. Namely, one end (the upper end) of the compression coil spring 80 abuts a region between the engaging ribs 68 (the engaging wall portion 56) and spring stoppers 84 (to be described later) which project-out at the inner surface of the ceiling plate 14A further toward the outer side than the engaging ribs 68 (the engaging wall portion 56). The other end (lower end) of the compression coil spring 80 is disposed in a state of abutting a region between the engaging wall portion 56 and an annular projection 58, which is provided at the top surface of the braking member 50 further toward the outer side than the engaging wall portion 56.

The braking member 50 is always urged downward by the urging force of the compression coil spring 80. Accordingly, when the recording tape cartridge 10 is not in use (is not loaded in the drive device), the recording tape cartridge 10 is in a state in which the braking gear 54 is always meshed-together with the engaging gear 48, and is in a rotation locked state in which relative rotation of the reel 20 with respect to the case 12 is impeded. Note that, at this time, the reel 20 is pressed against the lower case 16 side by this urging force, and the reel gear 32 is exposed from the gear opening 30.

A releasing member 60, which is molded of a resin material and is substantially triangular in plan view, is inserted within the reel hub 22 at the lower side of the braking member 50 (between the floor wall 28 and the braking member 50). Leg portions 62, which are inserted through the through holes 29 and project-out from the bottom surface of the floor wall 28 to predetermined heights above the reel gear 32, project at the bottom surface of the releasing member 60 at the respective vertices thereof. A substantially hemispherical releasing projection 52, which projects at the center of the bottom surface 50A of the braking member 50, abuts the center of a top surface 60A which is a flat surface of the releasing member 60. In this way, the surface area of contact between the big member 50 and the releasing member 60 is reduced, and the sliding resistance at the time of use (when the reel 20 rotates) is lessened. Note that the releasing member 60 is molded of, for examples polybutylene terephthalate (PBT).

Figure 6:
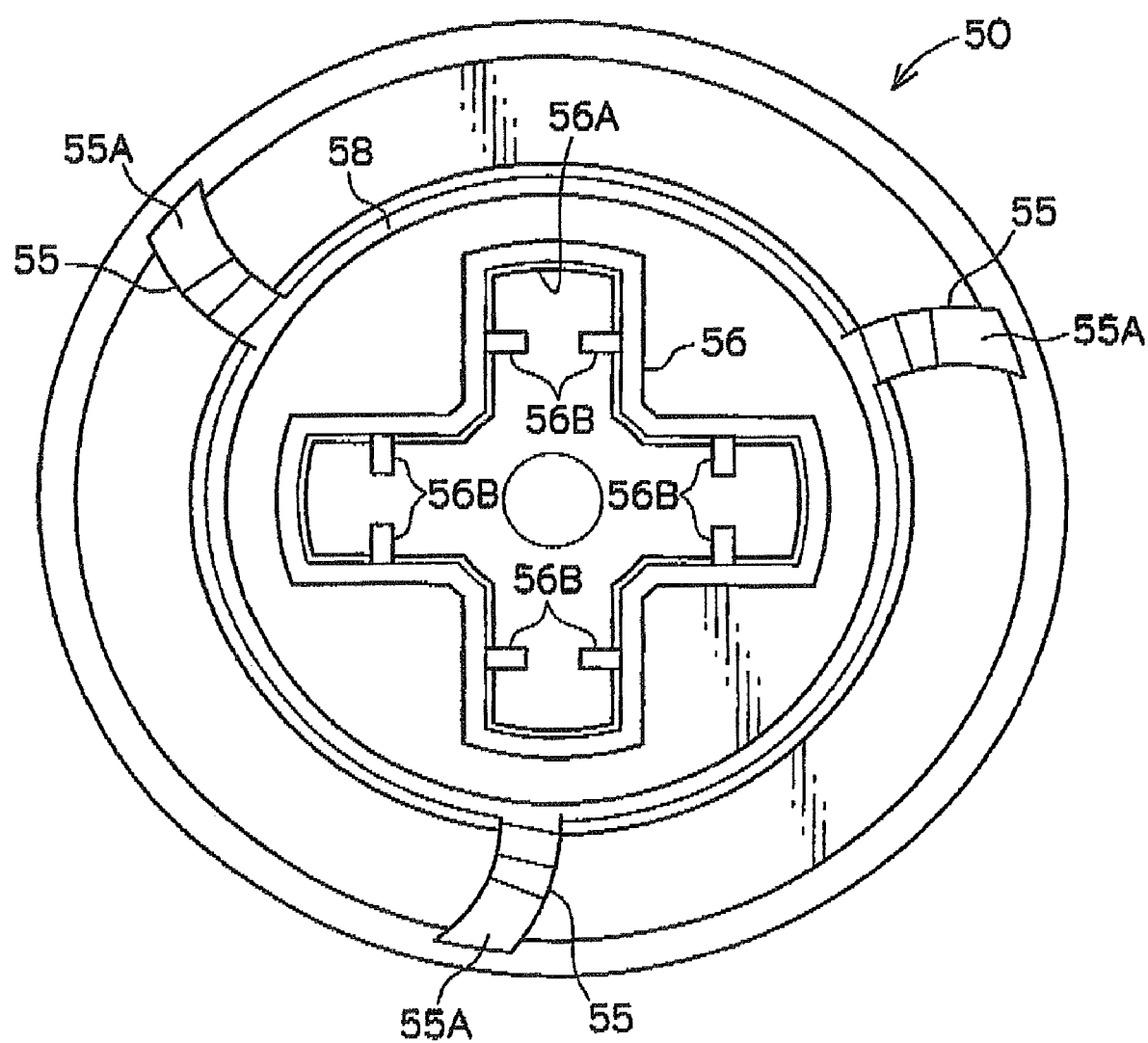
FIG. 6 is a schematic plan view of the braking member.
Figure 7:
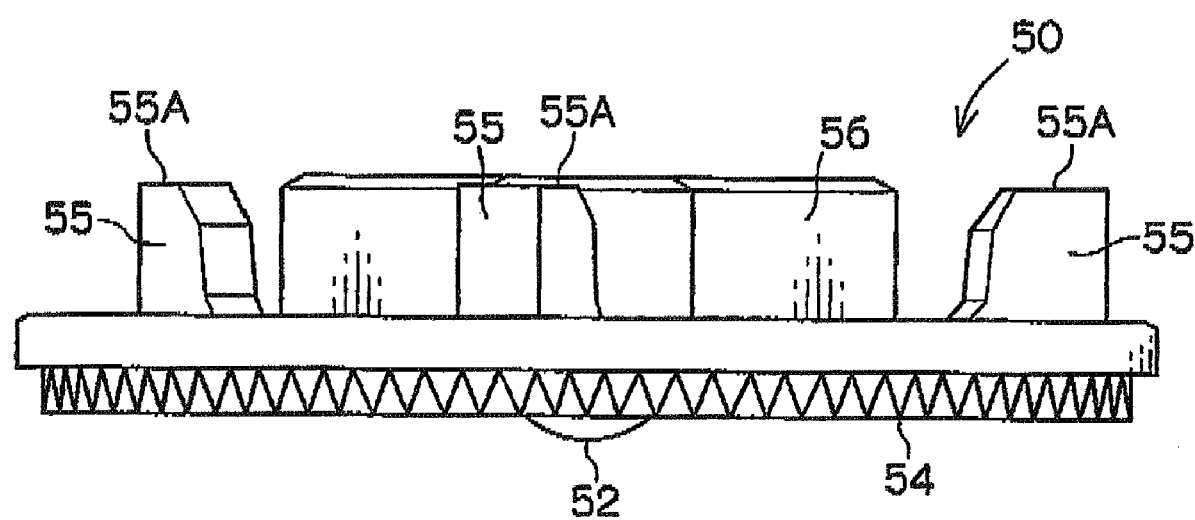
FIG. 7 is a schematic side view of the braking member.
Figure 8:
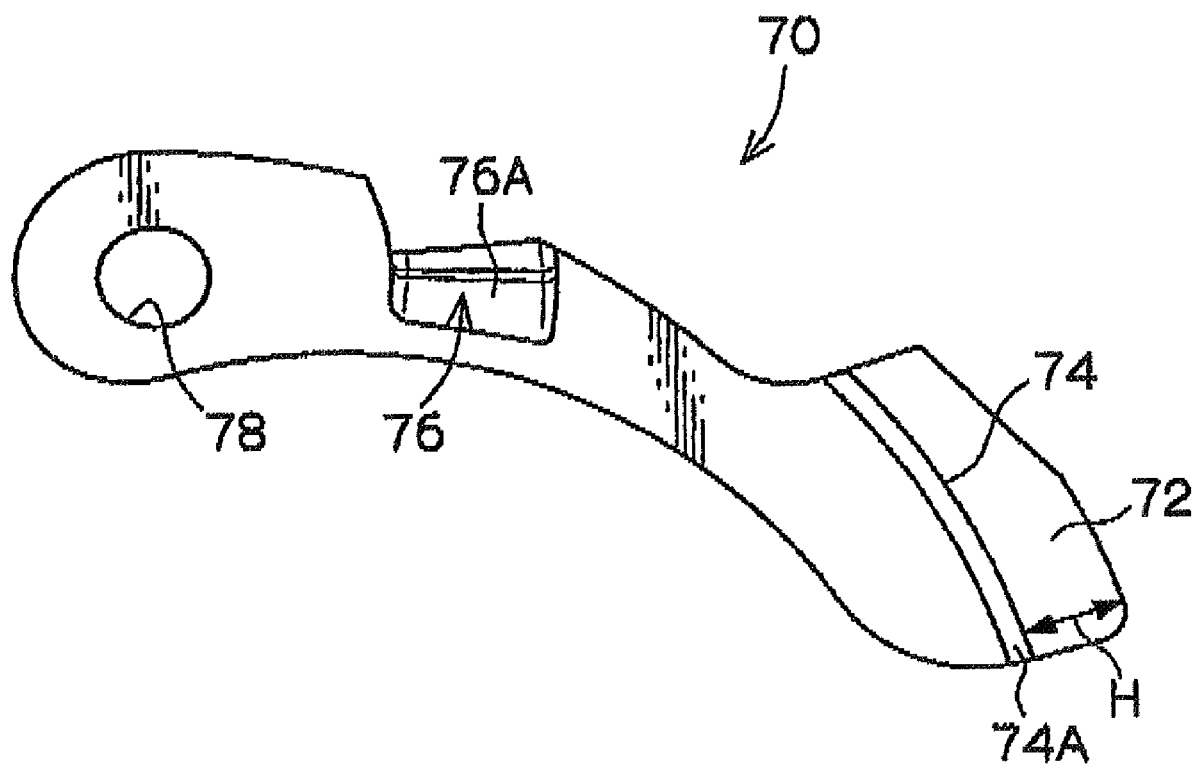
FIG. 8 is a schematic plan view of the locking member.
Figure 9:
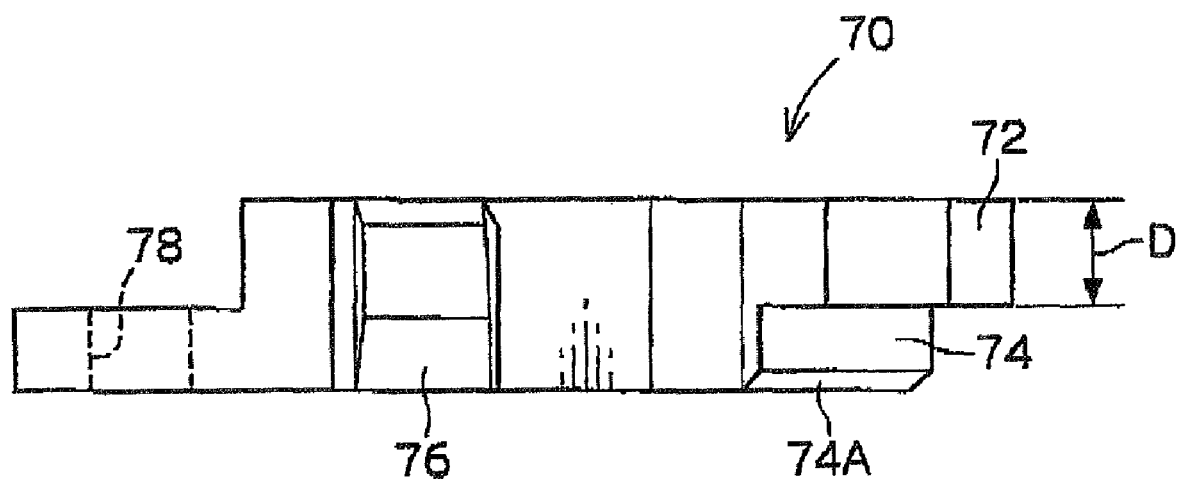
FIG. 9 is a schematic side view of the locking member.

As shown in detail in FIG. 6, plural (three in the illustrated structure) engaging projections 55, which serve as operation portions and are shaped as substantially arc-shaped plates in plan view, are provided at uniform intervals and project to predetermined heights at the top surface of the braking member 50 at the outer side of the annular projection 58. Accompanying the lock releasing operation (the rising-up) of the braking member 50, the engaging projections 55 can respectively enter into and abut the interiors of cam groove portions 76 of plural (three in the illustrated structure) locking members 70 which will be described later, and, in the peripheral direction of the reel 20, are curved toward the same direction.

As shown in FIG. 4 and in FIG. 8 through FIG. 13, the recording tape cartridge 10 has the locking members 70 which, when the recording tape cartridge 10 is not in use, restrict such that the reel 20 does not move inadvertently in the rotation axis direction (upward and downward). The locking members 70 are configured to be able to rotate within a horizontal plane orthogonal to the rotation axis direction of the reel 20 around positions which are different from the rotational center of the reel 20, and can be set at locking positions (engaging positions) at which the locking members 70 are interposed on an extended line of the reel hub 22 in the rotation axis direction at the side where the upper flange 24 is welded and impede movement of the reel 20 in the rotation axis direction, and unlocking positions (withdrawn positions) at which the locking members 70 are withdrawn from the extended line of the reel hub 22 in the rotation axis direction at the side where the upper flange 24 is welded and permit movement of the reel 20 in the rotation axis direction.

Namely, plural (three in the illustrated structure) mounting pins 82 serving as supporting members project at uniform intervals at the inner surface of the ceiling plate 14A of the upper case 14 on a circumference which is concentric with the axially central portion of the reel hub 22. The mounting pins 82 are inserted and fit in coil portions 92 of torsion springs 90, which serve as urging members which urge the locking members 70 in the directions of the locking positions, and through holes 78, which are formed in respective one end portions of the locking members 70, in that order (see FIG. 11). After the mounting pins 82 are inserted and fit therein, the locking members 70 are mounted so as to be able to rotate and so as to be prevented from falling-off from the mounting pins 82, either by caulking (crushing) the distal ends of the mounting pins 82 or by fitting-in an E ring (not shown) or the like.

Further, the spring stoppers 84 project at predetermined positions of the inner surface of the ceiling plate 14A. Respective one end portions 94 of the torsion springs 90 are anchored on the spring stoppers 84. Other end portions 96 of the torsion springs 90 are anchored on the locking members 70, and always urge the locking members 70 in the directions of the locking positions. Accordingly, due to the urging forces of the torsion springs 90, the locking members 70 rotate outwardly in the radial direction of the reel 20 around the mounting pins 82, such that engaging portions 72 and engaging surfaces 74, which will be described later, can engage with the inner peripheral edge portion, which includes the annular extended portion 24A of the upper flange 24, on the extended line of the reel hub 22 in the rotation axis direction.

Note that slide stoppers 86, which impede rotation of the locking members 70 beyond predetermined positions due to the urging forces of the torsion springs 90, project at the inner surface of the ceiling plate 14A in shapes which run substantially along the configurations of the side surfaces of the locking members 70 which the slide stoppers 86 abut (i.e., substantially arc-shaped in plan view), at positions and to heights such that the slide stoppers 86 do not interfere with the top surface of the upper flange 24 of the reel 20.

Further, the engaging portions 72 are formed at the other end portions (distal end portions) of the locking members 70 at the radial direction outer sides thereof. The engaging portions 72 engage, from the inner peripheral surface side of the reel hub 22, with the inner peripheral edge portion (including the annular extended portion 24A; the same holds hereinafter) of the upper flange 24 on the extended line of the reel hub 22 in the rotation axis direction, and are interposed between the inner surface of the ceiling plate 14A and the top surface of the upper flange 24, and impede movement of the reel 20 in the rotation axis direction (upward and downward).

The engaging portion 72 is formed in a substantial arc shape which substantially runs along the configuration of the reel hub 22 in plan view. When locked (engaged), a maximum width H (see FIG. 8) of the engaging portion 72 is larger than the plate thickness of the annular extended portion 24A of the upper flange 24 which engages with the inner peripheral surface of the reel hub 22 in plan view, and is of a size such that the engaging portion 72 does not go beyond the outer peripheral surface of the reel hub 22, and preferably is of a size such that the engaging portion 72 substantially reaches the outer peripheral surface of the reel hub 22. Further, the engaging portion 72 is formed to a size such that, when unlocked (withdrawn), the engaging portion 72 can surely be accommodated within the reel hub 22 (see FIG. 13). Moreover, a thickness D (see FIG. 9) of the engaging portion 72 is formed to be substantially the same as a distance W (see FIG. 2) between the inner surface of the ceiling plate 14A and the top surface of the upper flange 24 at the time when the reel 20 is positioned at its lowermost position within the case 12.

The engaging surface 74, which abuts the inner peripheral surface of the reel hub 22, is connected downwardly at the radial direction inner side of the engaging portion 72. The engaging surface 74 is formed to be an arc-shaped surface of the same curvature which matches the inner peripheral surface of the reel hub 22 in plan view (see FIG. 13). A taper surface 74A is formed at the lower end portion of the engaging surface 74. Accordingly, the locking members 70, which are in the state of being urged by the torsion springs 90 and abutting the slide stoppers 86>are structured such that, when the recording tape cartridge 10 is being assembled (when the upper case 14 is placed on the lower case 16), accompanying this operation, the engaging portions 72 and the engaging surfaces 74 can easily engage with the inner peripheral edge portion of the upper flange 24 on the extended line of the reel hub 22 in the rotation axis direction.

Figure 13:
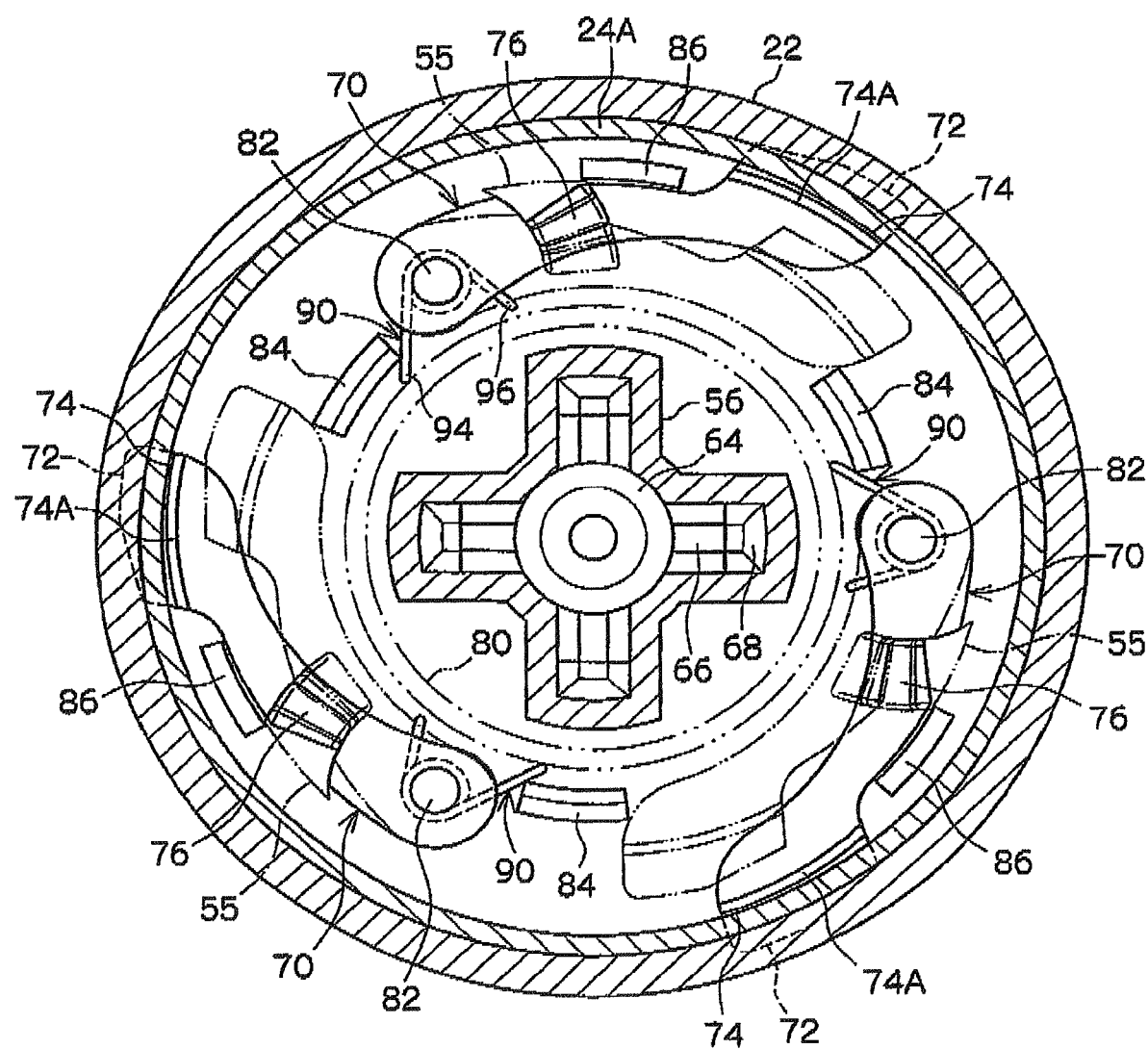
FIG. 13 is a schematic plan view showing the rotation operation of the locking members.

Further, the cam groove portion 76, which has an inclined surface (sliding surface) 76A which is inclined downwardly in a substantial arc shape in plan view toward the locking position direction side (the slide stopper 86 side), is formed at a predetermined position of the locking member 70 which position is further toward the through hole 78 side than the longitudinal direction central portion thereof. The engaging projection 55 of the braking member 50 can enter into and abut the cam groove portion 76. As shown in FIG. 13, in the peripheral direction of the reel 20, the inclined surfaces 76A are formed so as to be curved toward the same direction, and extend in directions intersecting the loci of rotation, of the locking members 70 (in directions which do not run along the loci of rotation of the locking members 70).

Accordingly, when the engaging projections 55 enter into the cam groove portions 76 as the braking member 50 rises-up, distal end surfaces 55A of the engaging projections 55 push the peak portions of the inclined surfaces 76A of the cam groove portions 76, and the distal end surfaces 55A slide as are on the inclined surfaces 76A. In this way, the locking members 70 can rotate toward the radial direction inner side (the rotational center side) of the reel 20 around the mounting pins 82 against the urging forces of the torsion springs 90, and the engaging portions 72 and the engaging surfaces 74 can withdraw from the inner peripheral edge portion of the upper flange 24 on the extended line of the reel hub 22 in the rotation axis direction.

In this way, the engaging portions 72 and the engaging surfaces 74 of the locking members 70 are configured to rotate (move) around the mounting pins 82 between the locking positions (engaging positions) at which the engaging portions 72 and the engaging surfaces 74 are restricted at the slide stoppers 86 and the unlocking positions (withdrawn positions) at which the engaging portions 72 and the engaging surfaces 74 are withdrawn from the inner peripheral edge portion of the upper flange 24 on the extended line of the reel hub 22 in the rotation axis direction, i.e., between positions on the extended line of the reel hub 22 in the rotation axis direction and the compression coil spring 80, and the range of rotation (range of movement) thereof can be made more compact.

Figure 10:
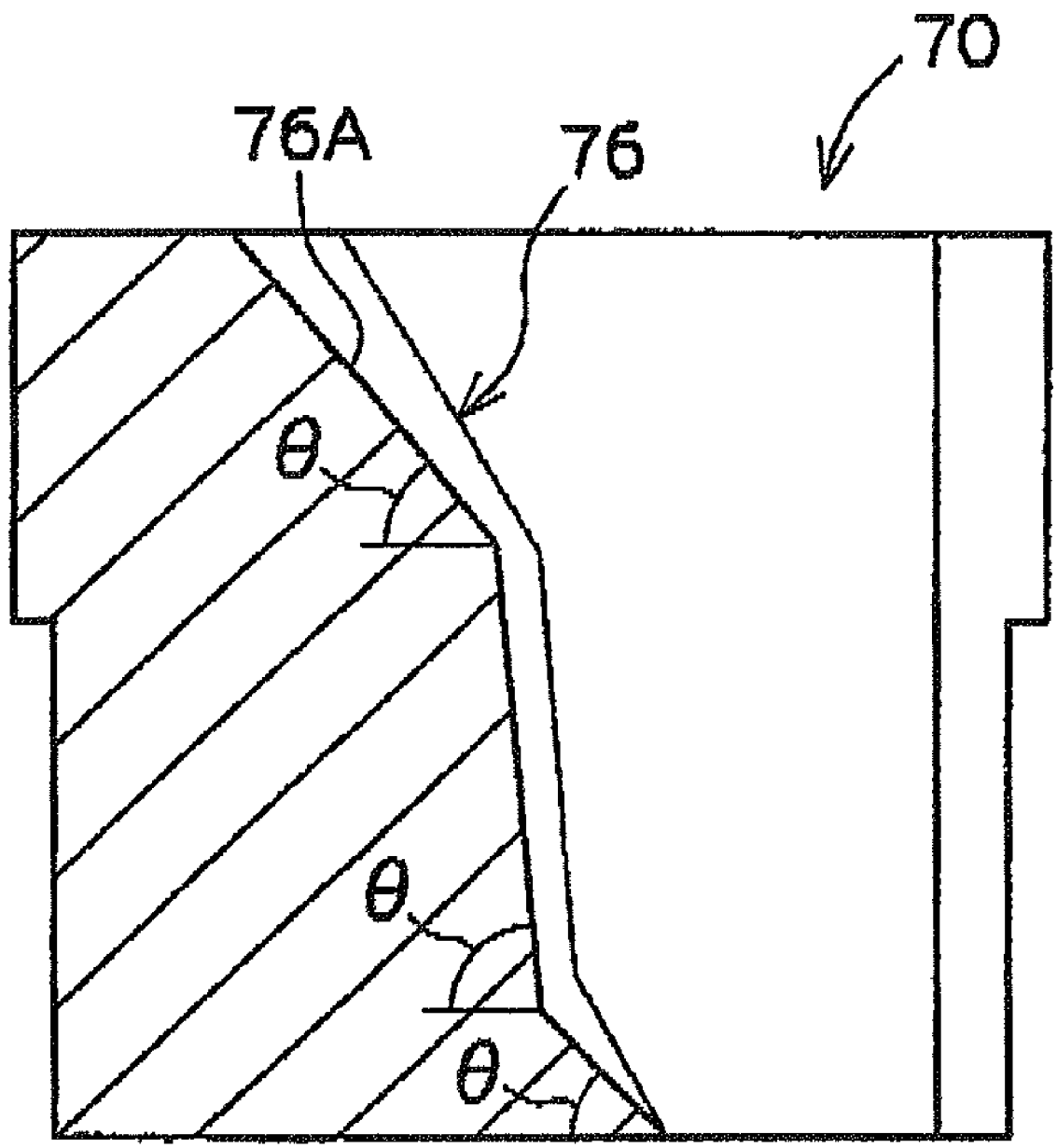
FIG. 10 is a schematic cross-sectional view showing the shape of a cam groove portion of the locking member.
Figure 11:
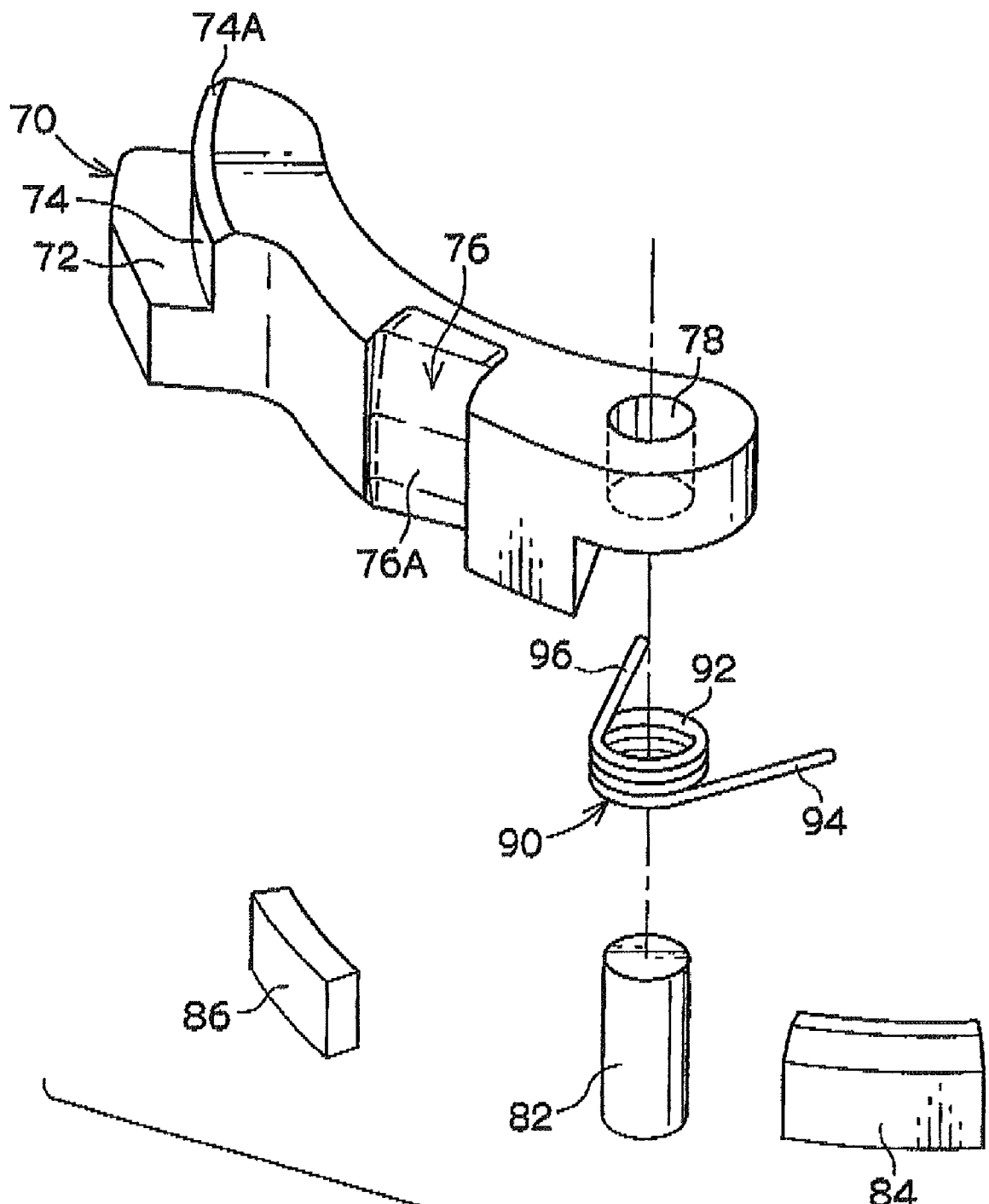
FIG. 11 is a schematic exploded perspective view showing a mounting structure of the locking member to an inner surface of a ceiling plate of an upper case.
Figure 12A:
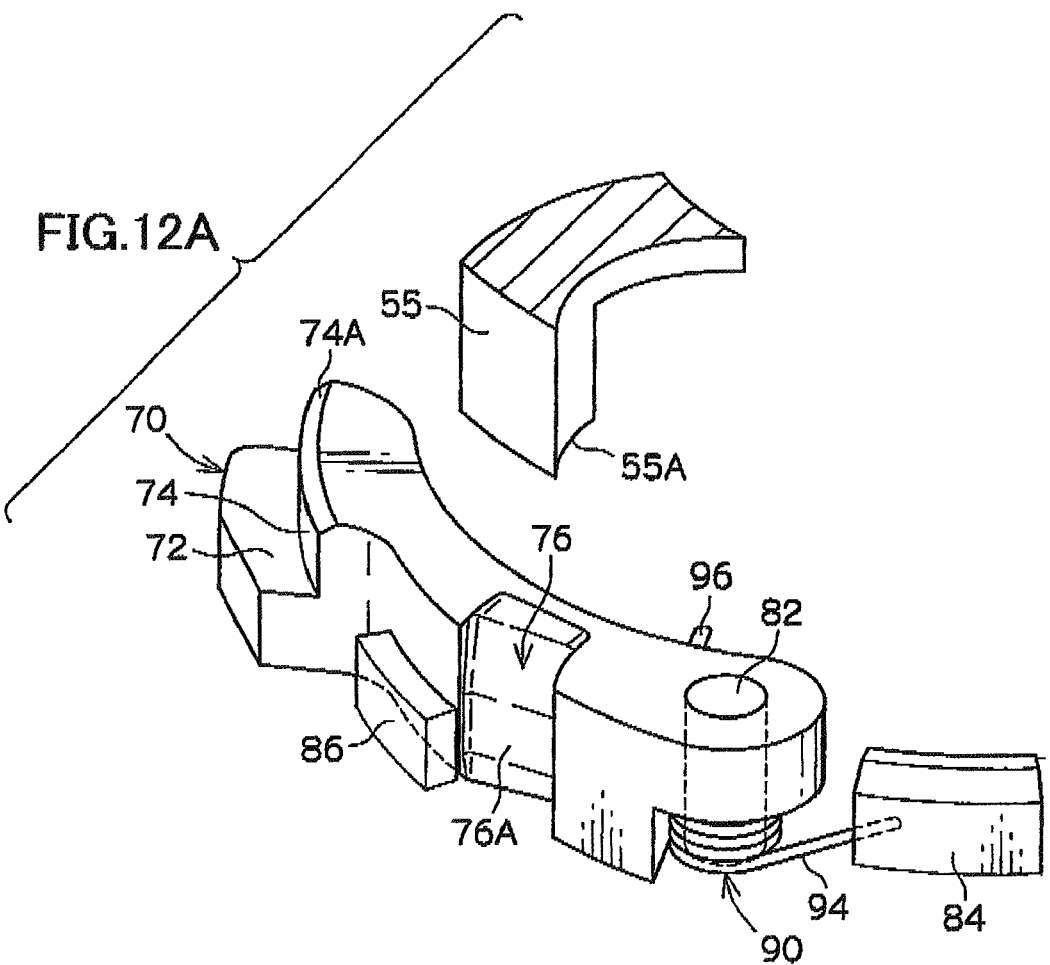
FIG. 12A and FIG. 12B are schematic perspective views showing rotation operation of the locking member.
Figure 12B:
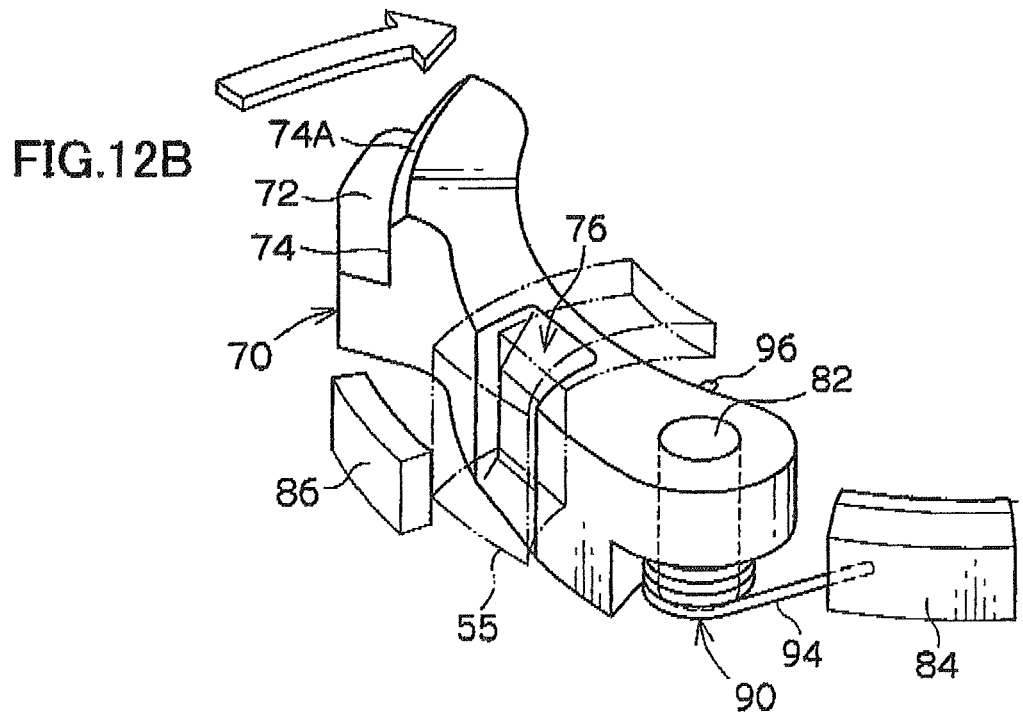

Here, at an arbitrary position of the inclined surface 76A, an angle of inclination $\theta$, formed between the inclined surface 76A and an imaginary plane orthogonal to the rotation axis direction of the reel hub 22, is made to be greater or equal to 45°, as shown in the cross-sectional view in FIG. 10. Even if the angle of inclination $\theta$ of the inclined surface 76A is formed at such a steep slope, the moving distance of the locking member 70 can sufficiently be ensured. Namely, when the locking members 70 are structured as described above even if the lock releasing force (pushing force) and the releasing (rising-up) stroke by the braking member 50 are small, the locking members 70 can be moved relatively greatly. Therefore, the locking members 70 can be reliably rotated to the unlocking positions (withdrawn positions).

Further, in order to make the slidability with respect to the ceiling plate 14A of the upper case 14 and the engaging projections 55 of the braking member 50 good, the locking members 70 are molded of a synthetic resin material containing polyacetal (POM), polyamide (PA), or polybutylene terephthalate (PBT) as the main component thereof, e.g., a synthetic resin material in which polytetrafluoroethylene (PTFE) or polyethylene (PE) is mixed together with POM, or a synthetic resin material in which molybdenum (Mo) is mixed together with PA, or the like. In this way, a dynamic friction coefficient $\mu$ of the inclined surface 76A of the cam groove portion 76 and the distal end surface 55A of the engaging projection 55 is less than or equal to 0.1.

Operation of the recording tape cartridge 10 which is structured as described above will be described next. When the recording tape cartridge 10 is not in use (is not loaded in the drive device), the opening 18 is closed by the door 46. The reel 20 is urged downward by the compression coil spring 80, via the braking member 50 and the releasing member 60. Namely, due to the urging force of the compression coil spring 80, the braking gear 54 of the braking member 50 strongly meshes together with the engaging gear 48 within the reel hub 22, and the boss 64, the rotation restricting ribs 66, and the engaging ribs 68 are inserted within the groove portion 56A of the engaging wall portion 56. Inadvertent rotation of the reel 20 is thereby impeded.

Further, due to the urging forces of the torsion springs 90, the locking members 70 are urged so as to rotate in the directions of the locking positions (engaging positions), and the engaging portions 72 and the engaging surfaces 74 are engaged with the inner peripheral edge portion of the upper flange 24 on the extended line of the reel hub 22 in the rotation axis direction. Namely, the engaging surfaces 74 abut the inner peripheral surface of the annular extended portion 24A (the reel hub 22) at a predetermined pressures and the engaging portions 72 are interposed between the top surface of the upper flange 24 and the inner surface of the ceiling plate 14A. Note that at this time, the locking members 70 are in states of being slightly separated from the slide stoppers 86, and are reliably engaged due to the urging forces of the torsion springs 90.

Here, the thickness D of the engaging portion 72 of the locking member 70 is formed to be substantially the same as the distance W between the inner surface of the ceiling plate 14A and the top surface of the upper flange 24 when the reel 20 is positioned at the lowermost position within the case 12. Further, the three locking members 70 are provided at uniform intervals (at 120° intervals). Accordingly, inadvertent rising-up of the reel 20 is stably impeded by the locking members 70. Namely, even if an impact is applied to the recording tape cartridge 10 due to the recording tape cartridge 10 being dropped or the like, rotation of the reel 20 is impeded by the braking member 50, and further, movement of the reel 20 in the rotation axis direction (upward and downward) is reliably impeded by the locking members 70.

By either caulking (crushing) the distal ends of the mounting pins 82 or fitting-in an E ring (not shown) or the like, the locking members 70 are mounted rotatably such that they are prevented from falling-off from the mounting pins 82. Therefore, the molds for molding the upper case 14 and the locking members 70 do not become complex, and the workability is good. Further, because it suffices to provide the torsion springs 90 as well at the mounting pins 82, assembly of the locking members 70 to the upper case 14 can be made easy.

Further, at the locking members 70, in plan view, the engaging surfaces 74 are formed to be arc-shaped surfaces which have the same curvature as the inner peripheral surface of the reel hub 22, and the engaging portions 72 are widths of extents such that the engaging portions 72 do not project-out from the outer peripheral surface of the reel hub 22 on the extended line of the reel hub 22 in the rotation axis direction, and the engaging portions 72 are interposed in substantial arc shapes which substantially run along the configuration of the reel hub 22. Therefore, the surface area of the locking members 70 pressing the reel 20 (the surface area of engagement) can be ensured to be a maximum. Namely, the locking members 70 can suitably press the inner peripheral edge portion of the upper flange 24 on the extended line of the reel hub 22 in the rotation axis direction.

In this way, the locking members 70 can suitably press the inner peripheral edge portion of the upper flange 24 which is welded to the reel hub 22. Therefore, force is suitably applied to the upper flange 24 in the direction of separating from the transverse direction end portion of the recording tap T. Accordingly, deformation of the upper flange 24 (deformation in the direction of approaching the transverse direction end portion of the recording tape T) due to tight-winding deformation of the reel hub 22 can be reliably suppressed.

When data is to be recorded onto the recording tape T of the recording tape cartridge 10 or data which is recorded on the recording tape T of the recording tape cartridge 10 is to be played-back, the recording tape cartridge 10 is loaded into the drive device (not shown). Namely, the recording tape cartridge 10 is inserted into a loading opening (not shown) of the drive device along the direction of arrow A from the front wall 12A side.

Then, first, an opening/closing member (not shown) which is provided at the drive device engages with the convex portion 46A of the door 46. In this state, when the recording tape cartridge 10 moves further in the direction of arrow A, the opening/closing member moves the convex portion 46A relatively backward against the urging force of the urging member. Thus, the door 46 from which the convex portion 46A projects is slid to the back side within the groove portions 38 along the right wall 12B, and opens the opening 18.

When the recording tape cartridge 10 is loaded (inserted) into the drive device and the opening 18 is completely opened, the recording tape cartridge 10 is lowered a predetermined height, and positioning members (not shown) of the drive device are inserted into hole portions for positioning (not shown) which are formed in the lower case 16. In this way, the recording tape cartridge 10 is positioned accurately at a predetermined position within the drive device, and further sliding of the door 46 (further movement of the door 46 backward) is restricted.

Due to the operation of the recording tape cartridge 10 being lowered, the rotating shaft 100 rises up relatively and enters-in from the gear opening 30, and causes the driving gear 102 to mesh with the reel gear 32. Thus, accompanying this operation of the driving gear 102 meshing with the reel gear 32, the leg portions 62, which project-out above the reel gear 32, are pressed upward against the urging force of the compression coil spring 80, and the braking member 50 is pressed upward via the releasing member 60, and the meshing-together of the braking gear 54 and the engaging gear 48 is released. Note that, at this time, because the boss 64, the rotation restricting ribs 66, and the engaging ribs 68 are inserted in the interior of the groove portion 56A of the engaging wall portion 56, the braking member 50 is in a state of being guided and can move upward without tilting.

Then, in the state in which the driving gear 102 and the reel gear 32 are completely meshed-together due to the reel plate 34 being attracted to and held by the magnetic force of an annular magnet (not shown) which is provided further toward the inner side than the driving gear 102, the reel 20 is set in a lock released state in which the reel 20 can rotate relative to the case 12 within the case 12 while the meshing-together of the reel gear 32 with the driving gear 102 is maintained.

Further, when the releasing member 60 moves upward, the braking member 50 rises-up against the urging force of the compression coil spring 80, and the distal end surfaces 55A of the engaging projections 55 push the peak portions of the inclined surfaces 76A at the cam groove portions 76 of the locking members 70, and slide as are on the inclined surfaces 76A. Thus, the locking members 70 rotate in the directions of the unlocking positions (withdrawn positions) around the mounting pins 82, against the urging forces of the torsion springs 90. At this time, the inclined surfaces 76A at the cam groove portions 76 and the engaging projections 55 which abut these inclined surfaces 76A are formed in substantial arc shapes in plan view which are both oriented in the same direction in the peripheral direction of the reel 20. Therefore, the abutting/sliding state thereof can be maintained for a longer period of time than if the inclined surfaces 76A and the engaging projections 55 are formed to be rectilinear.

Further, the annular extended portion 24A stands erect at the upper flange 24 which the locking members 70 press. Therefore, when the locking members 70 rotates to the unlocking positions, the time over which the locking members 70 press the inner peripheral edge portion of the upper flange 24 can be made to be longer by an amount corresponding to the region (the thickness) of the annular extended portion 24A. Accordingly, in a case in which, for example, the recording tape cartridge 10 is loaded in a drive device which is disposed vertically (in which the axis of the reel 20 is in the horizontal direction), offset of the reel 20 vertically downward can be suppressed by the locking members 70, and poor chucking by the rotating shaft 100 of the drive device (poor meshing-together of the driving gear 102 and the reel gear 32) can be avoided.

Further, the inclined surface 76A extends in a direction intersecting the locus of rotation of the locking member 70, and, at an arbitrary position thereof; the angle of inclination θ formed between the inclined surface 76A and an imaginary plane orthogonal to the rotation axis direction of the reel hub 22 is made to be greater than or equal to 45°. Accordingly, due to the rising-up stroke of the braking member 50, the engaging surfaces 74 of the locking members 70 can be surely separated from the inner peripheral surface of the annular extended portion 24A (the reel hub 22), and the engaging portions 72 of the locking members 70 can be reliably withdrawn from between the top surface of the upper flange 24 and the inner surface of the ceiling plate 14A, and are accommodated within the reel hub 22. In this way, the locking members 70 are maintained in unlocked states, and the reel 20 is able to rise-up a predetermined height within the case 12, and is able to be rotated and driven at the position of this predetermined height.

When the locking members 70 are configured to be set at the unlocking positions (withdrawn positions) by rotating toward the rotational center of the reel 20 in this way, dead space can be utilized effectively, and the occurrence of problems such as the locking members 70 impeding the rising-up of the reel 20 can be reliably prevented. Further, because the braking member 50 rises-up without tilting as described above, the problem of the lock releasing force (pushing force) with respect to the locking members 70 increasing does not arise.

Moreover because the braking member 50 and the locking members 70 are molded of POM, PA, PBT or the like and the upper case 14 as well is molded of PC or the like, the slidability between the braking member 50 (the engaging projections 55) and the locking members 70 (the cam groove portions 76), and between the locking members 70 and the ceiling plate 14A, improves. Further, because the locking members 70 are configured to rotate (move) within a horizontal plane orthogonal to the rotation axis direction of the reel 20, i.e., between the reel hub 22 and the compression coil spring 80, the moving distances thereof are shortened as compared with conventional locking members which move in the radial direction of the reel 20.

Accordingly, the sliding resistance can be lessened, and, even in an environment in which acceleration impact is applied continuously, such as the operation of loading into the drive device or the operation of loading into a library device or the like, the slidability is not adversely affected. Accordingly, problems such as the lock releasing force (pushing force) by the braking member 50 increasing do not arise, and it is possible to avoid bringing about breakage of the locking members 70 or trouble with the drive device, or the like. Namely, due thereto, the recording tape cartridge 10 which can withstand use of several ten-thousand times is obtained.

Moreover, the locking members 70 are not configured to move while straddling the compression coil spring 80, as is the case with conventional locking members. Accordingly, there is no need to provide limitations on the height of the compression coil spring 80, and the coil diameter thereof can be made to be small. Further, because it suffices for the space for the movement (rotation) of the locking members 70 to be small as described above, the space for disposition of the compression coil spring 80 can be sufficiently ensured. Accordingly, the structures at the periphery of the locking members 70 can be simplified.

On the other hand, the pull-out member (not shown) provided at the drive device enters into the case 12 from the opening 18 which has been opened, and grasps and pulls-out the leader pin 40 which is positioned and held at the pin holding portions 36. Note that, at this time, because the recording tape cartridge 10 is positioned accurately within the drive device, the pull-out member can reliably anchor the hooks thereof on the annular grooves 42 of the leader pin 40. Further, because the rotation locked state of the reel 20 is released, the reel 20 can rotate accompanying the operation of the pulling-out of the leader pin 40.

In this way, the leader pin 40 which is pulled-out from the opening 18 is accommodated at an unillustrated take-up reel. Then, due to this take-up reel and the reel 20 being rotated and driven synchronously, the recording tape T is successively pulled-out from the case 12 while being taken-up onto the take-up reel, and recording or playback of information is carried out by a recording/playback head (not shown) which is disposed along a predetermined tape path.

When the recording tape cartridge 10 for which recording or playback of information has been completed is to be ejected from the drive device, first, due to the rotating shaft 100 rotating reversely, the recording tape T is rewound onto the reel 20. Then, when the recording tape T is rewound to the end on the reel 20 and the leader pin 40 is held at the pin holding portions 36, the recording tape cartridge 10 is raised up a predetermined height, and the positioning members (not shown) are pulled-out from the hole portions for positioning (not shown).

Then, when the rotating shaft 100 is lowered relatively and begins to be pulled-out from the gear opening 30, due to the urging force of the torsion springs 90, the locking members 70 start to rotate around the mounting pins 82 in the directions of the locking positions (the engaging positions). Namely, the distal end surfaces 55A of the engaging projections 55 start to slide toward the peak portions of the inclined surfaces 76A at the cam groove portions 76. Then, when the rotating shaft 100 is relatively lowered even further, the magnet (not shown) separates from the reel plate 34, the meshing-together of the driving gear 102 with the reel gear 32 starts to be cancelled, and, at the point in time when the meshed-together amount of the reel gear 32 and the driving gear 102 decreases to about substantially half of the tooth height, the engaging portions 72 of the locking members 70 start to be interposed between the top surface of the upper flange 24 and the inner surface of the ceiling plate 14A.

Namely, before the meshing of the driving gear 102 with the reel gear 32 is completely cancelled (while the reel 20 is supported at the rotating shaft 100), the locking members 70 are interposed between the top surface of the upper flange 24 and the inner surface of the ceiling plate 14A and hold the reel 20 between the locking members 70 and the lower case 11, and impede rising-up of the reel 20. Accordingly, even in cases in which the recording tape cartridge 10 is ejected from a drive device which is disposed vertically (in which the axis of the reel 20 is in the horizontal direction), the top surface of the reel 20 is pressed by the locking members 70 so as to be unable to rise-up. Therefore, locking by the locking members 70 is reliably carried out without the reel 20 becoming offset vertically downward, and positional offset (center offset) with respect to the case 12 is prevented.

Thereafter, when the rotating shaft 100 is relatively lowered further and the meshing of the driving gear 102 with the reel gear 32 is completely cancelled, the engaging portions 72 and the engaging surfaces 74 engage with the inner peripheral edge portion of the upper flange 24 on the extended line of the reel hub 22 in the rotation axis direction. Namely, due to the locking members 70 attempting to rotate to the locking positions (engaging positions) at which the locking members 70 abut the slide stoppers 86 due to the urging forces of the torsion springs 90, the engaging surfaces 74 abut the inner peripheral surface of the annular extended portion 24A (the reel hub 22) at a predetermined pressure, and the engaging portions 72 are completely interposed between the top surface of the upper flange 24 and the inner surface of the ceiling plate 14A.

Then, when the distal end surfaces 55A of the engaging projections 55 separate from the inclined surfaces 76A of the cam groove portions 76, the braking member 50 and the releasing member 60 are pushed downward by the urging force of the compression coil spring 80, and when the braking member 50 and the releasing member 60 are lowered to the lowermost position within the case 12, the leg portions 62 are inserted through the through holes 29 and project-out to predetermined heights from the bottom surface of the floor wall 28 above the reel gear 32, and the braking gear 54 meshes strongly with the engaging gear 48. In this way, the reel 20 is again set in a rotation locked state in which relative rotation thereof within the case 12 is impeded, and is set in a state in which inadvertent movement thereof in the rotation axis direction is impeded Thereafter, the recording tape cartridge 10 is moved in the direction opposite the direction of arrow A by an unillustrated ejecting mechanism. Thus, accompanying this movement, the door 46 is slid in the direction of closing the opening 18 by the urging force of the urging member, and the opening 18 is completely closed (is returned to its initial state). In this way, the recording tape cartridge 10, at which relative rotation of the reel 20 with respect to the case 12 and movement of the reel 20 in the rotation axis direction are locked and at which the opening 18 is closed, is completely ejected from the interior of the drive device.

As described above, at the recording tape cartridge 10, the locking members 70 which impede movement of the reel 20 upward and downward (in the rotation axis direction) are configured to be able to rotate with a horizontal plane orthogonal to the rotation axis direction of the reel 20, around positions which are different from the rotational center of the reel 20. Therefore, as compared with locking members which move in the radial direction of the reel 20, the moving distance thereof can be shortened, and, as a result, the sliding resistance can be lessened. Further, because the locking members 70 are structured to press the inner peripheral edge portion of the upper flange 24 which is welded to the reel hub 22, force is applied to the upper flange 24 in the direction of separating from the transverse direction end portion of the recording tape T. Accordingly, deformation of the upper flange 24 (deformation in the direction of approaching the transverse direction end portion of the recording tape T) due to tight-winding deformation of the reel hub 22 can be suppressed.

Note that three of the locking members 70 are provided at uniform intervals in the above-described embodiment. However, it is preferable to provide at least three or more of the locking members 70 at uniform intervals. When three or more of the locking members 70 are provided at uniform intervals, movement of the reel 20 in the rotation axis direction (upward and downward) can be impeded stably. Further, in the above-described embodiment, the braking member 50 is configured to move in the rotation axis direction of the reel 20 (upward and downward) while being guided by the guide portion which extends in four directions orthogonal to the moving direction of the braking member 50, i.e., while being guided by the engaging wall portion 56 which is substantially cross-shaped in plan view. However, it suffices for the guide portion which guides the braking member 50 to extend in at least three directions orthogonal to the moving direction of the braking member 50.

Moreover, the inclined surfaces 76A of the cam groove portions 76 are formed in substantial arc shapes in plan view in the above-described embodiment. However, the inclined surfaces 76A may be rectilinear in plan view, provided that the inclined surfaces 76A are structured such that the releasing stroke of the locking members 70 by the braking member 50 can be ensured. Further, when the locking members 70 are structured in this way so as to be set at the locking positions and the unlocking positions by being rotated, the degrees of freedom in design of the diameter of the reel hub 22 increase. Namely, the locking members 70 can be applied to various types of reel 20 at which the diameters of the reel hubs 22 are different.

Still further, in the above-described embodiment, the locking members 70 are configured to be rotated by engaging with the braking member 50. However, the structure which rotates the locking members 70 is not limited to this. For example, a structure may be employed in which moving members, which rotate the locking members 70 between their locking positions and unlocking positions, are provided separately from the braking member 50. However, in this case, it is preferable that the moving members be configured to operate interlockingly with the braking member 50. In any case, with a structure in which the locking members 70 are rotated by using the existing braking member 50, there is no need to provide separate moving members, and therefore, there is the effect that the manufacturing cost can be reduced.

The present invention provides a recording tape cartridge in which sliding resistance at the time when locking members are moved between locking positions and unlocking positions can be lessened, and in which deformation of a flange welded to a hub also can be suppressed A first aspect of the present invention provides a recording tape cartridge comprising: a reel having a hub on which a recording tape is wound, and flanges holding the recording tape wound on the hub, at least one of the flanges being welded to the hub; a case accommodating the reel singly and rotatably; and a locking member configured to be able to rotate within a plane which is orthogonal to a rotation axis direction of the reel around a position which is different from a rotational center of the reel, the locking member being set at a locking position, at which the locking member is interposed on an extended line of the hub in the rotation axis direction at a side where the flange is welded and the locking member impedes movement of the reel in the rotation axis direction, and an unlocking position, at which the locking member is withdrawn from the extended line of the hub in the rotation axis direction at the side where the flange is welded and the locking member permits movement of the reel in the rotation axis direction.

In accordance with the above-described aspect, the locking member is set at the locking position and the unlocking position by rotating within a plane orthogonal to the rotation axis direction of the reel. Accordingly as compared with a locking member which moves in the radial direction of the reel, the moving distance thereof can be shortened, and, as a result, the sliding resistance can be lessened. Further, because the locking member presses a position on the extended line of the hub in the rotation axis direction at the side where the flange is welded, force is applied to that flange in a direction of separating from the recording tape. Accordingly, deformation of the flange (deformation in the direction of approaching the recording tape) due to tight-winding deformation of the hub can be suppressed.

In the above-described aspect, the locking member may be configured to be interposed, from an inner peripheral surface side of the hub, on the extended line of the hub in the rotation axis direction, and does not go beyond an outer peripheral surface of the hub in plan view.

In accordance with the above-described aspect, the locking member can suitably press a position on the extended line of the hub in the rotation axis direction at the side where the flange is welded. Namely, force is suitably applied to that flange in a direction of separating from the recording tape. Accordingly, deformation of the flange (deformation in the direction of approaching the recording tape) due to tight-winding deformation of the hub can be reliably suppressed In the above-described aspect, the flange which is welded to the hub may have an extended portion which engages with an inner peripheral surface of the hub In accordance with the above-described aspect, the extended portion, which engages with the inner peripheral surface of the hub, is provided at the flange which the locking member presses. Therefore, when the locking member rotates to the unlocking position, the time over which the locking member presses this flange can be made to be longer by an amount corresponding to the region (the thickness) of the extended portion. Accordingly, in a case in which for example, the recording tape cartridge is loaded in a drive device which is disposed vertically, offset of the reel vertically downward can be suppressed by the locking member, and poor chucking by the rotating shaft of the drive device can be avoided.

In the above-described aspect, an engaging surface, which has a substantially similar curvature as a peripheral surface of the hub, may be formed at a distal end portion of the locking member which is interposed on the extended line of the hub in the rotation axis direction, and a distance to be moved by the locking member between the locking position and the unlocking position is shortened.

In accordance with the above-described aspect, the surface area of the distal end portion of the locking member pressing a position on the extended line of the hub in the rotation axis direction can be ensured to be the maximum. Accordingly, the locking member can suitably press a position on the extended line of the hub in the rotation axis direction. Further, a distance to be moved by the locking member between the locking position and the unlocking position can be shortened clue to forming the engaging surface at the distal end portion of the locking member.

The above-described aspect may be structured such that the locking member is rotated by a moving member which moves in the rotation axis direction of the reel, the moving member is urged directly or indirectly toward a floor wall of the reel by a second urging member, and the moving member and the second urging member are provided at an inner peripheral side of the locking member in a radial direction of the reel.

In accordance with the above-described aspect, the structures at the periphery of the locking members can be simplified.

In this way, the present invention can provide a recording tape cartridge in which sliding resistance at the time when locking members are moved between locking positions and unlocking positions can be lessened, and in which deformation of a flange welded to a hub also can be suppressed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A recording tape cartridge comprising:
a reel having a hub on which a recording tape is wound, and flanges holding the recording tape wound on the hub, at least one of the flanges being welded to the hub;
a case accommodating the reel singly and rotatably; and
a locking member configured to be able to pivot within a plane which is orthogonal to a rotation axis direction of the reel around a position which is different from a rotational center of the reel, the locking member being set at a locking position, at which the locking member is interposed on an extended line of the hub in the rotation axis direction at a side where the flange is welded and the locking member impedes movement of the reel in the rotation axis direction, and an unlocking position, at which the locking member is withdrawn from the extended line of the hub in the rotation axis direction at the side where the flange is welded and the locking member permits movement of the reel in the rotation axis direction.

2. The recording tape cartridge of claim 1, wherein the locking member is configured to be interposed, from an inner peripheral surface side of the hub, on the extended line of the hub in the rotation axis direction, and does not go beyond an outer peripheral surface of the hub in plan view.

3. The recording tape cartridge of claim 1, wherein the flange which is welded to the hub has an extended portion which engages with an inner peripheral surface of the hub.

4. The recording tape cartridge of claim 1, wherein an engaging surface, which has a substantially similar curvature as a peripheral surface of the hub, is formed at a distal end portion of the locking member which is interposed on the extended line of the hub in the rotation axis direction, and a distance to be moved by the locking member between the locking position and the unlocking position is shortened.

5. The recording tape cartridge of claim 1, wherein the locking member is pivoted by a moving member which moves in the rotation axis direction of the reel, the moving member is urged toward a floor wall of the reel by a second urging member, and the moving member and the second urging member are provided at an inner peripheral side of the locking member in a radial direction of the reel.

* * * * *